No. 618,083. Patented Jan. 24, 1899.
O. H. GENTRY.
DRIVING BELT FOR SPROCKET WHEELS.
(Application filed July 12, 1898.)
(No Model.)
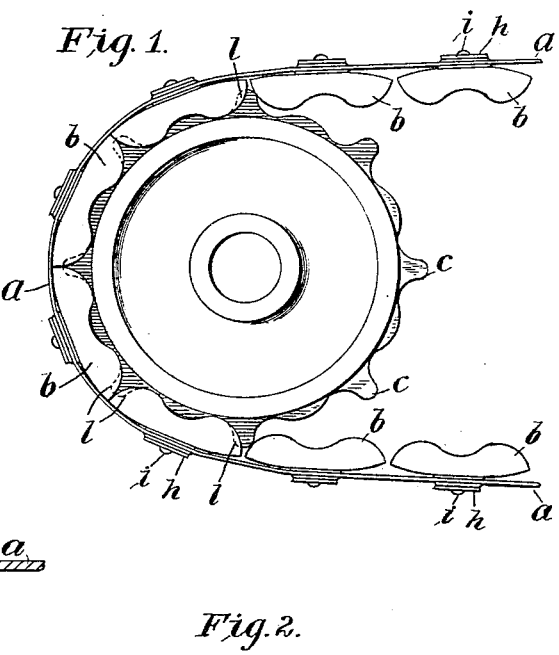
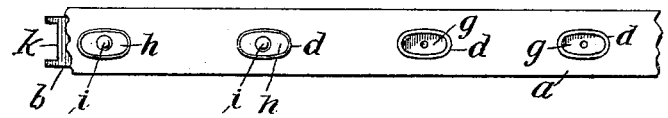
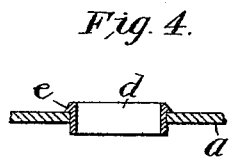
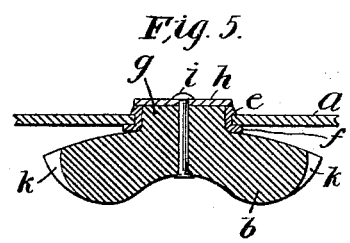
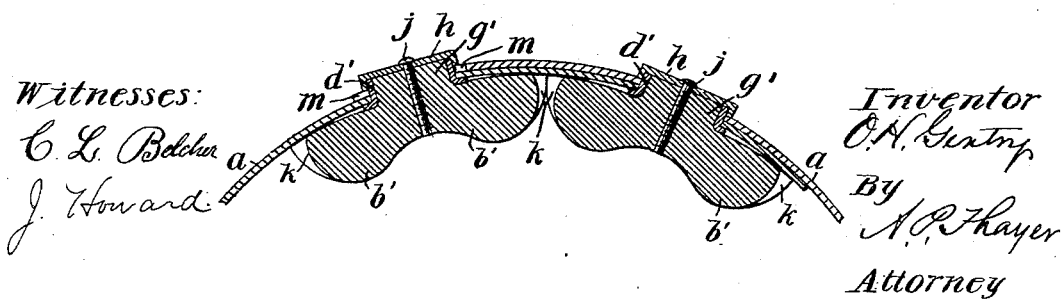
Witnesses:
C. L. Belcher
J. Howard
Inventor
O. H. Gentry
By N. P. Thayer
Attorney

UNITED STATES PATENT OFFICE.

OLIVER H. GENTRY, OF NEW YORK, N. Y., ASSIGNOR TO JACOB R. SHIPHERD, TRUSTEE OF SARAH V. GENTRY, OF SAME PLACE.

DRIVING-BELT FOR SPROCKET-WHEELS.

SPECIFICATION forming part of Letters Patent No. 618,083, dated January 24, 1899.

Application filed July 12, 1898. Serial No. 685,739. (No model.)

*To all whom it may concern:*

Be it known that I, OLIVER H. GENTRY, a citizen of the United States of America, and a resident of New York city, (Brooklyn,) State of New York, have invented certain new and useful Improvements in Driving-Belts for Sprocket-Wheels, of which the following is a specification.

My invention consists of improvements in the construction of driving-belts for sprocket-wheels, and designed more particularly for adaptation to the sprocket-wheels of bicycles now used with chains, but applicable for driving other machinery, as hereinafter described, reference being made to the accompanying drawings, in which—

Figure 1 is a side elevation of a portion of a driving-belt of my invention as applied to a bicycle sprocket-wheel. Fig. 2 is a plan view of a short section of such a belt with some of the securing-caps detached. Fig. 3 is a longitudinal section of a detached block. Fig. 4 is a longitudinal section of a short piece of the block-coupling metallic strip and an eyelet employed in connecting a block to the strip, said eyelet being in a condition to illustrate the mode of applying the eyelets. Fig. 5 is a section of a short piece of the strip, a block connected thereto, and the devices employed in making the connection. Fig. 6 is a section showing the lap of the ends of the strip for connecting them, with two blocks connected.

The purpose of my invention is to utilize light steel or other metallic strips, as $a$, with attached blocks $b$ in lieu of the pivoted links of the common pitch-chains and adapted for use with the ordinary chain-driven sprocket as a cheaper construction, more durable, and especially one that will not stretch, and for use on bicycles it will not collect and retain dirt as much as the pivot-jointed chains and will be much easier to clean.

The essential idea of the belt is blocks $b$, so constructed as to mesh with the sprockets $c$ to apply the power practically the same as the links of the ordinary chains, and thereby be applicable to the sprocket-wheels on which the ordinary chains are used and being positively connected with the strip, so as to afford it the greatest available freedom for flexure on the sprocket-wheels and without any parts in the connecting-joints that are movable relatively to each other, and thereby subject to wear. To this end the strip $a$ is punched at suitable intervals along it dependent on the distance of the sprocket-teeth apart on the pitch-line, the perforations being preferably elliptical and having the major axis in the lengthwise direction of the strip, and the perforations are reinforced with a metallic eyelet $d$, inserted, as indicated in Fig. 4, and flanged over, as in Fig. 5, for being effectually secured by the head $e$ on one side and the flange $f$ on the other side of the strip. These eyelets are employed to reinforce the thin edges of the strip for sustaining the stresses to which said thin edges are subjected.

The blocks $b$ have a stud $g$ at the middle of the back, insertible in an eyelet with its end flush with the top of the eyelet, and they are secured by a cap $h$ and a rivet $i$ or a screw $j$, as preferred, making a rigid connection in which there are no movable parts to wear and get slack, and the elliptical form of the perforations and the studs keeps the blocks in alinement. The blocks are notched on the ends at $k$ to overlap the sides of the sprocket-teeth, as indicated by dotted lines $l$ in Figure 1, to prevent escape of the links laterally.

To connect the ends of the strip, one or more blocks, as $b'$, are made with a stud $g'$ of sufficiently greater length to extend through the two laps, and the eyelet $d'$ is also made longer and without the head $e$, so that both laps may be coupled on it and the stud, and the cap and link are secured by a screw $j$ in preference to a rivet, although a rivet may be used; but the screw, being more readily manipulated, is preferred in this case. One such lap connection on the stud of a single link is practically sufficient; but if it be desired to extend the outer lap along to the stud of the next link as a means of preventing the outward or upward projection of the end of said lap, as it would if left to such action, it may be so arranged as represented at the left hand in Fig. 6, said end being slotted, as indicated at $m$, and the cap $h$ being applied so as not to clamp said lap too tightly, and thus permit the slight movement of the outer lap relatively to the inner one necessary because of the greater radius of the outer lap.

It will be seen that this improved driving-belt is interchangeable with the common bicycle driving-chains for application to the chain-wheels of nearly all forms of construction now in use.

I claim—

1. In a bicycle-belt for sprocket-wheels having projecting teeth at intervals along the rim, the combination with a metallic strip, of elongated blocks adapted to the spaces between said projecting teeth and rigidly secured at the middle of the back to said strip at intervals along the same, corresponding with the pitch of the teeth of the sprocket-wheels on which the belt is to be used, said blocks adapted on the face to mesh with the spaces between the teeth of the common chain sprocket-wheels, and to take effect at the ends on the teeth of the wheels substantially as described.

2. In a driving-belt for sprocket-wheels, the combination with a metallic strip, of blocks rigidly secured at the middle of the back to said strip at intervals along the same, corresponding with the pitch of the sprocket-wheels on which the belt is to be used, said blocks adapted on the face to mesh with the spaces between the teeth of the said sprocket-wheels and notched at the ends to overlap the sides of the teeth of said wheels substantially as described.

3. In a driving-belt for sprocket-wheels, the combination with a metallic strip perforated at intervals along its length corresponding with the pitch of the sprocket-wheels on which the belt is to be used, of eyelets reinforcing said perforations, and blocks having a stud at the middle of the back insertible in said eyelets, said blocks being clamped to said strip by a cap, and a fastening device connecting the block and cap through the strip, and said blocks being adapted to mesh with the ordinary chain sprocket-wheels substantially as described.

4. In a driving-belt for sprocket-wheels comprising blocks and a metallic strip connected at intervals along the strip corresponding with the pitch of the sprocket-wheels on which the belt is to be used, the extremities of the strip having positive connection together, forming an endless belt, and the outer lap extended from such connection along the inner lap, and having another connection having an elongated opening permitting compensating movement relatively to said inner lap substantially as described.

Signed by me, at New York, this 11th day of July, 1898.

OLIVER H. GENTRY.

Witnesses:
   J. M. HOWARD,
   C. SEDGWICK.